(12) United States Patent
Hagiwara

(10) Patent No.: US 7,079,475 B2
(45) Date of Patent: Jul. 18, 2006

(54) PRE-PIT INFORMATION-DETECTING APPARATUS, OPTICAL-INFORMATION DETECTING APPARATUS, PROGRAM, AND COMPUTER-READABLE INFORMATION-RECORDING MEDIUM

(75) Inventor: Kei Hagiwara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/927,138

(22) Filed: Aug. 27, 2004

(65) Prior Publication Data

US 2005/0122884 A1 Jun. 9, 2005

Related U.S. Application Data

(63) Continuation of application No. PCT/JP04/06023, filed on Apr. 26, 2004.

(30) Foreign Application Priority Data

Dec. 5, 2003 (JP) .............................. 2003-406978

(51) Int. Cl.
G11B 7/005 (2006.01)
G11B 5/09 (2006.01)

(52) U.S. Cl. .......................... 369/124.12; 369/124.15; 369/59.17; 369/47.27; 369/124.07

(58) Field of Classification Search ............... 369/47.1, 369/47.25, 47.28, 47.27, 44.29, 44.36, 59.17, 369/59.15, 59.21, 124.01, 124.07, 124.12, 369/124.14, 124.15

See application file for complete search history.

(56) References Cited

U.S. PATENT DOCUMENTS

| | | | |
|---|---|---|---|
| 6,487,149 B1 * | 11/2002 | Yokoi et al. | 369/47.25 |
| 6,519,214 B1 | 2/2003 | Hikima | |
| 6,556,523 B1 * | 4/2003 | Masui | 369/47.28 |
| 6,603,726 B1 * | 8/2003 | Yoshida et al. | 369/124.01 |
| 6,757,233 B1 * | 6/2004 | Akabane et al. | 369/59.17 |
| 6,801,488 B1 * | 10/2004 | Kato et al. | 369/47.28 |
| 6,891,782 B1 * | 5/2005 | Saito et al. | 369/44.29 |
| 6,912,190 B1 * | 6/2005 | Inokuchi et al. | 369/59.15 |

FOREIGN PATENT DOCUMENTS

| | | |
|---|---|---|
| JP | 2000-113463 | 4/2000 |
| JP | 2000-149259 | 5/2000 |
| JP | 2000-207744 | 7/2000 |
| JP | 2002-93061 | 3/2002 |

* cited by examiner

*Primary Examiner*—William Korzuch
*Assistant Examiner*—Kim-Kwok Chu
(74) *Attorney, Agent, or Firm*—Dickstein Shapiro Morin & Oshinsky LLP

(57) ABSTRACT

An apparatus for detecting pre-pit information is disclosed, including an optical pickup, an optical-detecting section, a difference-detecting circuit, a first peak-value detecting circuit, a filtering circuit, a second peak-value detecting circuit, a differential potential-dividing circuit, and a comparator.

22 Claims, 13 Drawing Sheets

PRE-PIT INFORMATION-DETECTING APPARATUS, OPTICAL-INFORMATION DETECTING APPARATUS, PROGRAM, AND COMPUTER-READABLE INFORMATION-RECORDING MEDIUM

CROSS-REFERENCE TO RELATED APPLICATION

This application is a U.S. continuation application filed under 35 U.S.C 111(a) claiming benefit under 35 U.S.C 120 and 365(c) of PCT application JP2004/006023, filed Apr. 26, 2004, which claims priority to Application Ser. No. 2003-406978, filed in Japan on Dec. 5, 2003. The foregoing applications are hereby incorporated herein by reference.

TECHNICAL FIELD

The present invention generally relates to a technology for optically recording information on an information-recording medium, and, more particularly, to a pre-pit information-detecting apparatus for detecting information regarding pre-pits, on an optical-information recording medium having guiding grooves forming information-recording tracks and pre-pits preset in between the guiding grooves, an optical-information recording apparatus provided with the pre-pit information-detecting apparatus, a program for controlling, with computer operations, the optical-information recording apparatus, and a computer-readable information recording medium for storing the program.

BACKGROUND ART

In recent years, of the types of Digital Versatile Disks (DVDs), a recording-type optical disk has been prevalent as the optical-information recording medium, for example DVD-R or DVD-RW (below also called "DVD-R/RW" as a whole), in which wobbling for causing a zigzag movement on the guiding grooves to be the information-recording track is provided at the time of manufacturing the disks in order to accurately detect the corresponding linear velocities at the respective radial positions. In such a case, a format is adopted such that the wobble frequency is set to be constant when performing CLV (Constant Linear Velocity) rotational control. Thus, in an optical-disk apparatus using the optical disk as described above, a signal based on the wobbling on the guiding grooves (called "a wobble signal") is detected so as to control rotation of the optical disk and to generate a clock for recording.

Furthermore, in compact disks such as CD-R and CR-RW, for example, address (time) information called ATIP is provided using frequency modulation, and in other DVDs such as DVD+R and DVD+RW, address information called ADIP is recorded in the wobble signal using phase modulation.

However, in the case of the DVD-R/RW as described above, the wobble signal does not contain information within the disk face, and instead pre-pits which contain address information are formed in a track (a land), for guiding, between two tracks (guiding grooves). A wobble signal is a signal generated at a constant periodicity with a relatively small amplitude, whereas a pre-pit (LPP: Land Pre-Pit) signal is a signal generated intermittently with a relatively large amplitude, so that basically both are separable.

The pre-pit signal is obtained by binarizing with a pre-determined slice level a signal based on a push-pull signal detected with an optical-detecting device having at least two optical-detecting regions of an optical pickup. However, the maximum-amplitude value of the pre-pit signal may vary depending on the optical-axial offset of an object lens of the optical-disk apparatus, the tilt of the disk, a variation in the reflectance within the disk face, etc.

Therefore, when fixing the slice level so as to binarize the push-pull signal containing the pre-pit signal, it may lead to erroneously detecting the pre-pit signal. More specifically, in a prerecorded region within the disk face, it is important to set the slice level more appropriately since the crosstalk noise from a RF signal of the recording data leads to a likelihood of erroneously detecting the pre-pit signal.

Thus, in the related art, a method of appropriately setting the slice level is proposed as follows.

For instance, in Patent Document 1, a pre-pit signal-detecting circuit is disclosed in which a maximum-amplitude value of the pre-pit signal is detected so as to potentially-divide the detected value for setting the slice level.

Patent Document 1
JP2000-207744A

However, with such related-art method, as the wobble signal itself, which may be a cause of the erroneous detection, is not detected and a comparison with the wobble signal is not performed when setting the slice level, there exist a problem in which the likelihood of the erroneous detection may remain.

DISCLOSURE OF THE INVENTION

Accordingly, it is a general object of the present invention to provide a technology for optically recording information on an information recording medium that substantially obviates one or more problems caused by the limitations and disadvantages of the related art.

It is a more particular object of the present invention to enable a stable and appropriate detection of information regarding pre-pit (pre-pit signal) provided in an optical-information recording medium by eliminating the effect of noise such as wobble signals, and, thereby, to enable an optical-information recording apparatus with an accurate accessing of the desired track on the optical-information recording medium.

According to the invention, an apparatus for detecting pre-pit information includes an optical pickup configured to irradiate a light beam onto an optical-information recording medium having guiding grooves to be an information-recording track and pre-pits preset in between the guiding grooves, an optical-detecting section configured to optically detect the beam reflected at the optical-information recording medium, having at least two optical-detecting regions divided across the track, a difference-detecting circuit configured to detect the difference between the respective signals output from the two optical-detecting regions of the optical-detecting section, a first peak-value detecting circuit configured to detect and output the peak value of a signal output from the difference-detecting circuit, a filtering circuit configured to extract a signal based on wobble of the guiding grooves from the signal output at the difference-detecting circuit, a second peak-value detecting circuit configured to detect and output the peak value of a signal output from the filtering circuit, a differential potential-dividing circuit configured to potentially-divide at a predetermined proportion and output the difference between the output value of the first peak-value detecting circuit and the output value of the second peak-value detecting circuit, and a comparator configured to compare the output of the difference-detecting circuit and the output of the differential potentially-dividing circuit so as to output information regarding the pre-pits.

An apparatus for detecting pre-pit information in an embodiment of the invention enables a stable and appropriate detection of information regarding pre-pit (pre-pit signal) provided in an optical-information recording medium.

According to another aspect of the invention, an apparatus for detecting pre-pit information includes an optical pickup configured to irradiate a light beam onto an optical-information recording medium including guiding grooves to be an information-recording track and pre-pits preset in between the guiding grooves, an optical-detecting section configured to optically detect the beam reflected at the optical-information recording medium, including at least two optical-detecting regions divided across the track, a difference-detecting circuit configured to detect the difference between the respective signals output from the two optical-detecting regions of the optical-detecting section, a first voltage-detecting circuit configured to detect and output the peak voltage of a difference signal output from the difference-detecting circuit, a filtering circuit configured to eliminate from the difference signal a detected pre-pit component, a second voltage-detecting circuit configured to detect and output the peak voltage or average voltage of a signal output from the filtering circuit, a differential potential-dividing circuit configured to divide at a predetermined ratio and output the difference between the output voltage of the first voltage-detecting circuit and the output voltage of the second voltage-detecting circuit, and a comparator configured to compare the difference signal and an output voltage of the differential potential-dividing circuit so as to output information regarding the pre-pit.

An apparatus for detecting pre-pit information in an embodiment of the invention enables a stable and appropriate detection of information regarding pre-pit (pre-pit signal) provided in an optical-information recording medium.

BRIEF DESCRIPTION OF THE DRAWINGS

Other objects, features, and advantages of the present invention will become more apparent from the following detailed descriptions when read in conjunction with the accompanying drawings, in which.

BEST MODE FOR CARRYING OUT THE INVENTION

Below, specific descriptions are given based on the accompanying drawings, on best mode for carrying out the present invention.

Configuration Common to Each Embodiment

Figure 1:
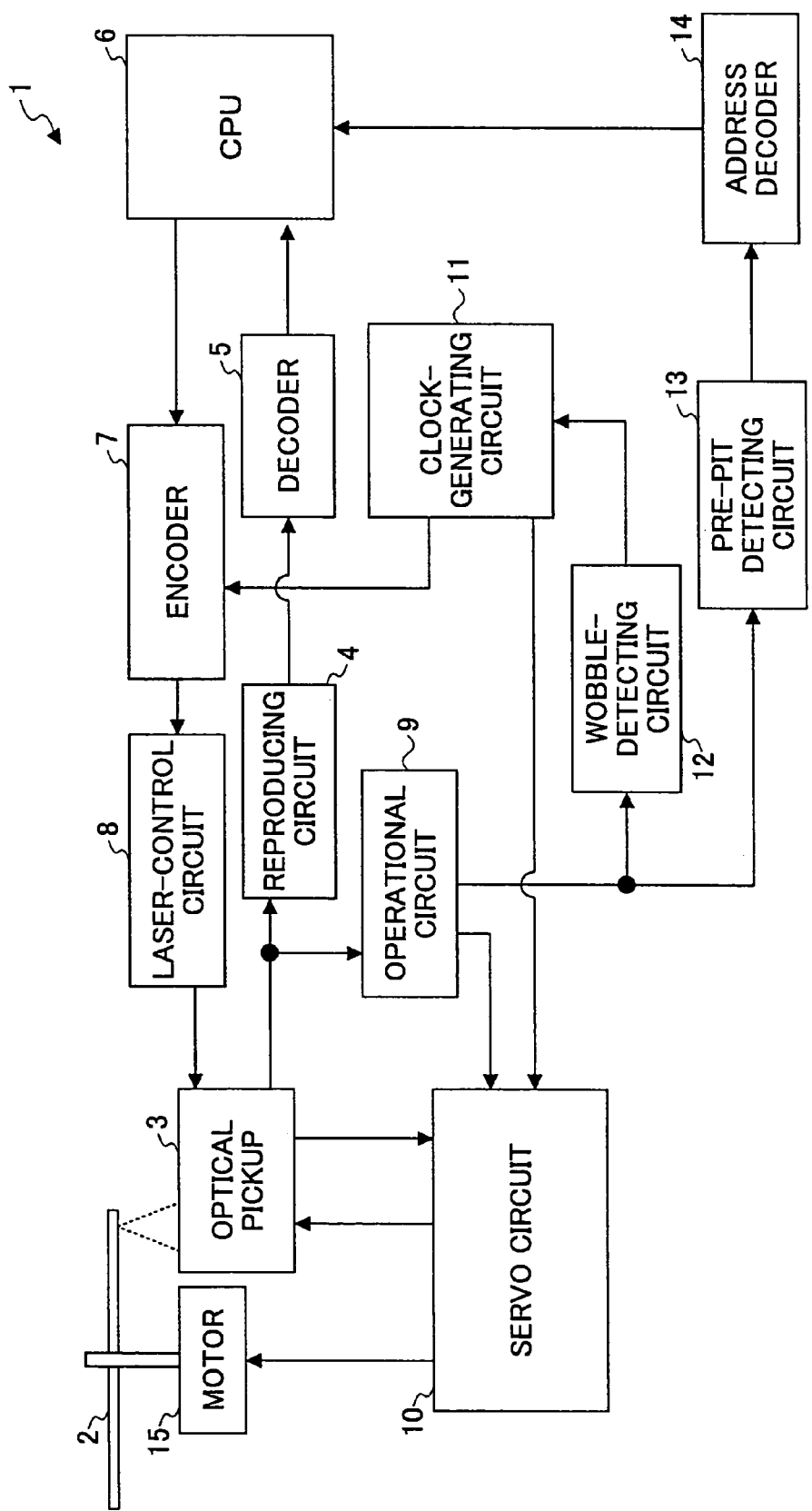
FIG. 1 is a block diagram illustrating a configuration of an optical disk apparatus which is an embodiment of an optical-information recording apparatus provided with a pre-pit information-detecting apparatus according to the invention.
Figure 2:
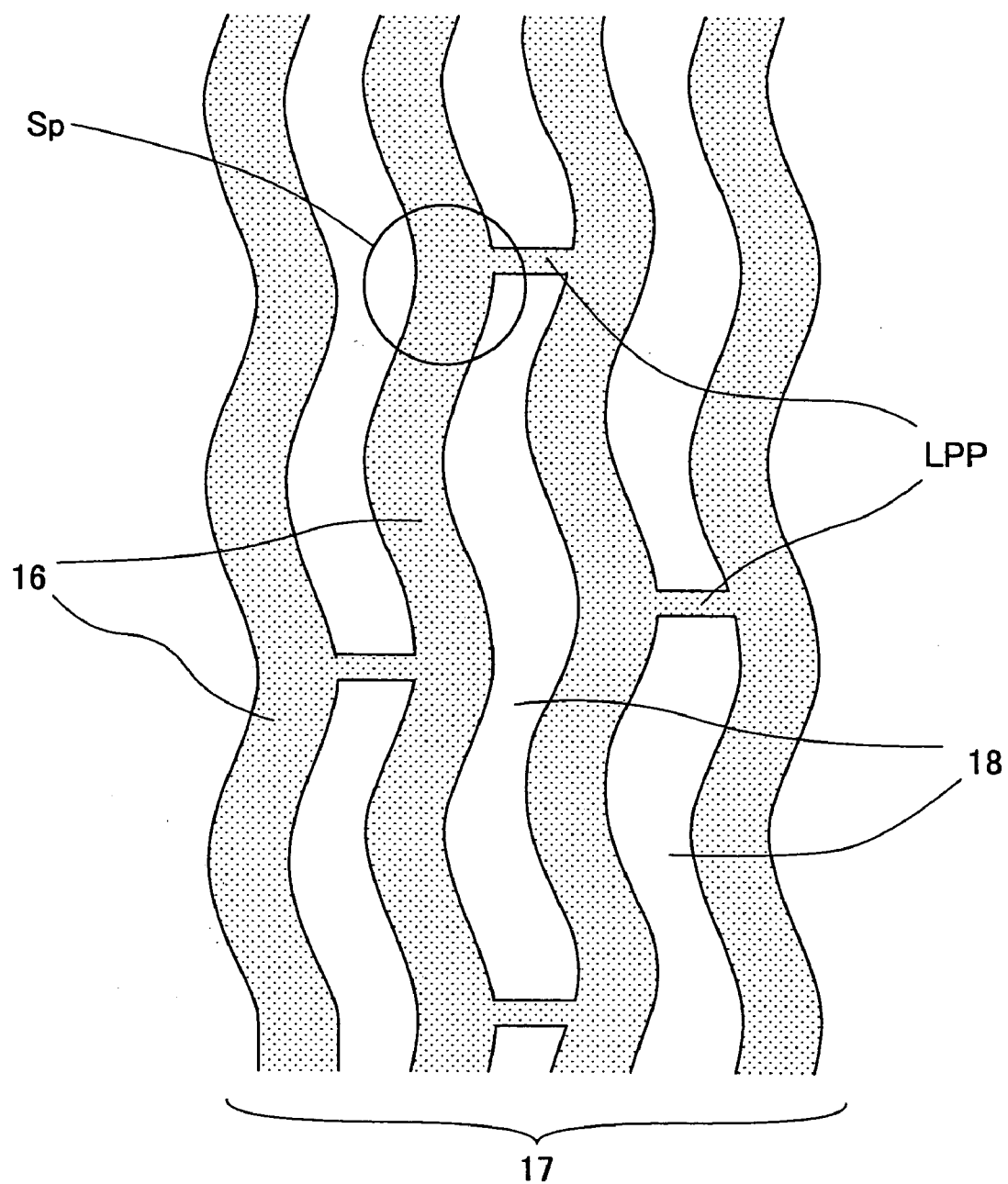
FIG. 2 is a diagram illustrating a configuration of each track with an enlarged disk face of an optical disk which is an optical-information recording medium to be used in the optical-disk apparatus.
Figure 3:
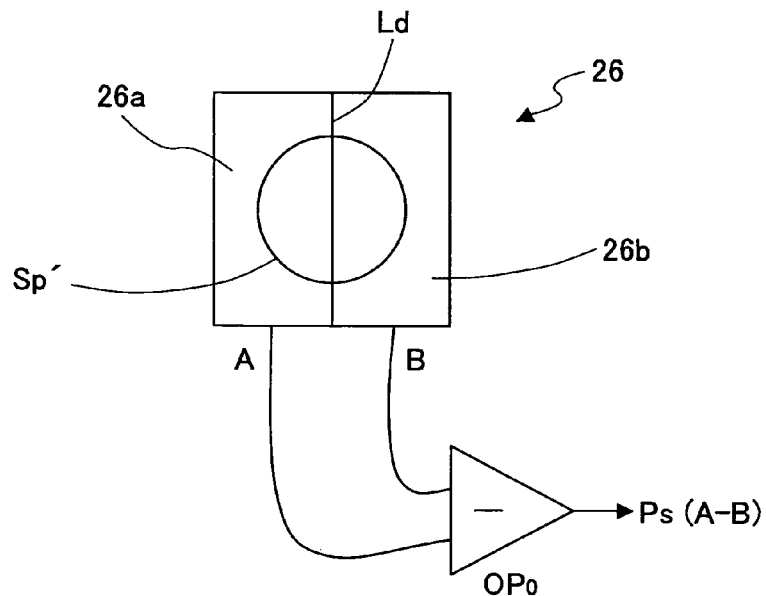
FIG. 3 is a diagram illustrating an example configuration of an optical-detecting device and its output-signal detecting section of an optical pickup in the optical-disk apparatus illustrated in FIG. 1.

FIG. 1 is a block diagram illustrating a configuration of an optical-disk apparatus which is an embodiment of an optical-information recording apparatus provided with a pre-pit information-detecting apparatus according to the invention. FIG. 2 is a diagram illustrating a configuration of each track with an enlarged disk face of an optical disk which is an optical-information recording medium to be used in the optical-disk apparatus, and FIG. 3 is a diagram illustrating an example configuration of an optical-detecting apparatus and its output-signal detecting section of an optical pickup in the optical-disk apparatus illustrated in FIG. 1.

The optical-disk apparatus 1 illustrated in FIG. 1, a DVD-R/RW drive apparatus which uses a DVD-R/RW as an optical disk 2 so as to record/reproduce information in the optical disk 2, is provided with an optical pickup 3, a reproducing circuit 4, a decoder 5, a microcomputer 6 (a CPU in FIG. 1), an encoder 7, a laser-control circuit 8, an operational circuit 9, a servo circuit 10, a clock-generating circuit 11, a wobble-detecting circuit 12, a pre-pit (LPP) detecting circuit 13, an address decoder 14, and a motor 15 for causing the optical disk 2 to rotate.

The microcomputer (below abbreviated as "the CPU") 6, consisting of a central processing unit, a ROM as a program memory and a RAM as a data memory, etc., centrally controls each section of the optical disk apparatus 1.

The optical pickup 3 is configured with a laser-beam source such as a semiconductor laser, an optical system consisting of a collimator lens, a condenser lens and a beam splitter, etc., for condensing a laser beam emitted by the laser-beam source so as to irradiate a spot beam on the optical disk 2 and for splitting the beam reflected from the optical disk, and an optical-detecting device as an optical-detecting section for optically detecting the beam reflected so as to convert it to an electrical signal (a reproducing signal). The optical pickup 3 is movable in radial directions of the optical disk 2 with a motor for tracking and a straight-line feeding mechanism (not shown).

In the optical-disk apparatus 1, at a time of recording information, the information to be recorded is fed into the encoder 7 from an external host-computing apparatus via the CPU 6, the encoder 7 converts the data format of the information, and the laser-control circuit 8 controls emission of the laser-beam source mounted on the optical pickup 3 according to bits in the information so that an operation of recording onto the optical disk 2 with the spot beam for recording is performed.

At a time of reproducing, the optical pickup 3 irradiates on the optical disk 2 a spot beam for reproducing with the laser beam and detects the beam reflected with the optical-detecting device, and the reproducing circuit 4 performs filtering and digitization on the detected reproducing signal. Then, the decoder 5 converts the format of the data generated at the reproducing circuit 4, and the CPU 6 sends the reproduced information to the external host computing apparatus (not shown).

A servo signal is generated by the operational circuit 9 from two signals respectively detected by two optical-detecting regions of the optical-detecting device, provided in the optical pickup 3, as described below, with a two-part configuration divided across a track of the optical disk 2, the servo circuit 10 drives and controls the motor for tracking as described above according to the servo signal so as to control the tracking position of the optical pickup 3. Moreover, the servo circuit 10, based on a clock signal output from the clock-generating circuit 11, also controls rotation of the motor 15 for causing the optical disk to rotate.

Moreover, each signal detected respectively by the two optical-detecting regions of the optical-detecting device is operated on with the operational circuit 9 so as to be sent to the wobble-detecting circuit 12 and the pre-pit detecting circuit 13. Then, based on a wobble clock detected with the wobble-detecting circuit 12, the clock-generating circuit 11 generates an accurate clock signal which follows the rotating of the optical disk 2.

Moreover, the pre-pit detecting circuit 13 detects from an output signal of the operational circuit 9 a pre-pit signal including physical-address information, and the address decoder 14 converts the signal into address information and obtains the address information of the position in the optical disk 2 accessed by the optical pickup 3 at that time.

Now, configuration of the track on the optical disk 2, etc., is described with reference to FIG. 2.

On the optical disk 2 such as the DVD-R/RW, as illustrated in FIG. 2, guiding grooves called grooves 16, are engraved in a wobbling and spiral fashion, so that the grooves 16 constitute a track 17 per orbit (revolution) of the information recorded. In the case of the DVD-R, on the groove 16 tracking control of the optical pickup 3 is performed, and, with a beam spot Sp, the recording and reproducing of data are performed at a constant linear velocity. A section in between neighboring grooves 16 is called a land 18, and on the land 18 a pre-pit LPP for showing the position information of the optical disk 2 has been prerecorded since the manufacturing phase of the disk.

The optical-detecting device provided in the optical pickup 3 as the optical-detecting section, as in an optical-detecting device 26 illustrated in FIG. 3, has at least two optical-detecting regions 26a, 26b divided across the track by a dividing line Ld along a tangential line of the track, the device being configured with two optical-detecting elements. Then, with the respective optical-detecting regions 26a, 26b, corresponding halves of a beam spot Sp' from the reflected beam of the beam spot Sp irradiated onto the optical disk 2 are optically detected so as to be converted respectively to electrical signals. Now, as the simplest wobble-signal operation for detecting wobble information of the grooves 16 illustrated in FIG. 2, as illustrated in FIG. 3, a method is adopted in which, with a subtractor using an operational amplifier OP0, the difference between output signals A and B (A–B) from the respective optical-detecting regions 26a, 26b is computed.

Moreover, the pre-pit LLP illustrated in FIG. 2 refers to information recorded at the outer-periphery side of the disk relative to the center of the track 17 so that, with an unrecorded disk, only the optical-detecting region 26b at the outer-periphery side detects the information so as to enable detecting of the pre-pit. However, after data have been recorded into the optical disk 2, when detecting only from the optical-detecting region 26b, a radio-frequency (RF) signal component of data detected from the track 17 becomes noise so that the pre-pit cannot be detected accurately.

Therefore, it is common to eliminate the RF signal component by obtaining the difference between output signals A and B (A–B) from the two optical-detecting regions 26a, 26b, so as to detect the pre-pit signal.

Figure 4:
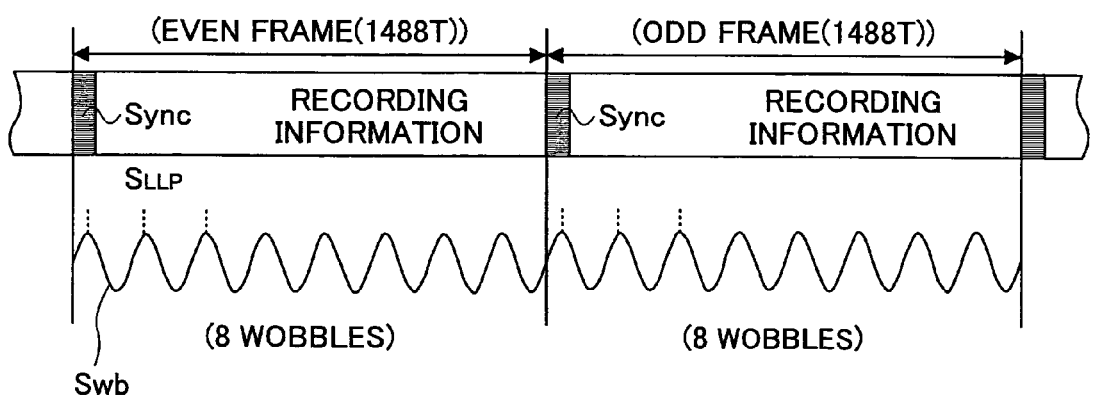
FIG. 4 is a diagram for describing a configuration of a wobble signal and a pre-pit signal in a case of a DVD-R/RW.

FIG. 4 is a diagram for describing a wobble signal and a pre-pit signal in the case of a DVD-R/RW. In this example, it is assumed that pre-pit signal to be detected $S_{LLP}$ appears as positive pulses as illustrated by broken lines at the positive side of wobble signal $S_{wb}$. However, there may be cases in which the pre-pit signal $S_{LPP}$ appears as negative pulses at the negative side of the wobble signal $S_{wb}$.

Setting the period of the channel bit (at the reference linear velocity of 26.15625 MHz) of the DVD as TC, the wobble-signal period TW corresponds to 186 TCs (approximately 140 MHz in the reference velocity), and one sync frame corresponds to 8 wobbles.

With one sector of DVD data consisting of 26 sync frames, referring to the respective frames starting from the top frame of the sector as an EVEN frame and then an ODD frame, the pre-pit LPP is recorded in either the EVEN or ODD frame. Basically, the pre-pit LPP is recorded at the corresponding peak positions of the respective top 3 wobbles of the EVEN frame, whereas for the positions with a likelihood of causing interference with pre-pit LPP recorded at the inner periphery side, the pre-pit LLP is recorded in the ODD frame, the recorded positions being different depending on the sector. Furthermore, the pre-pit signal $S_{LPP}$ constitutes one bit per two frames, and 1 bit of Sync and 12 bits of data (recording information) are recorded per one sector.

Figure 5:
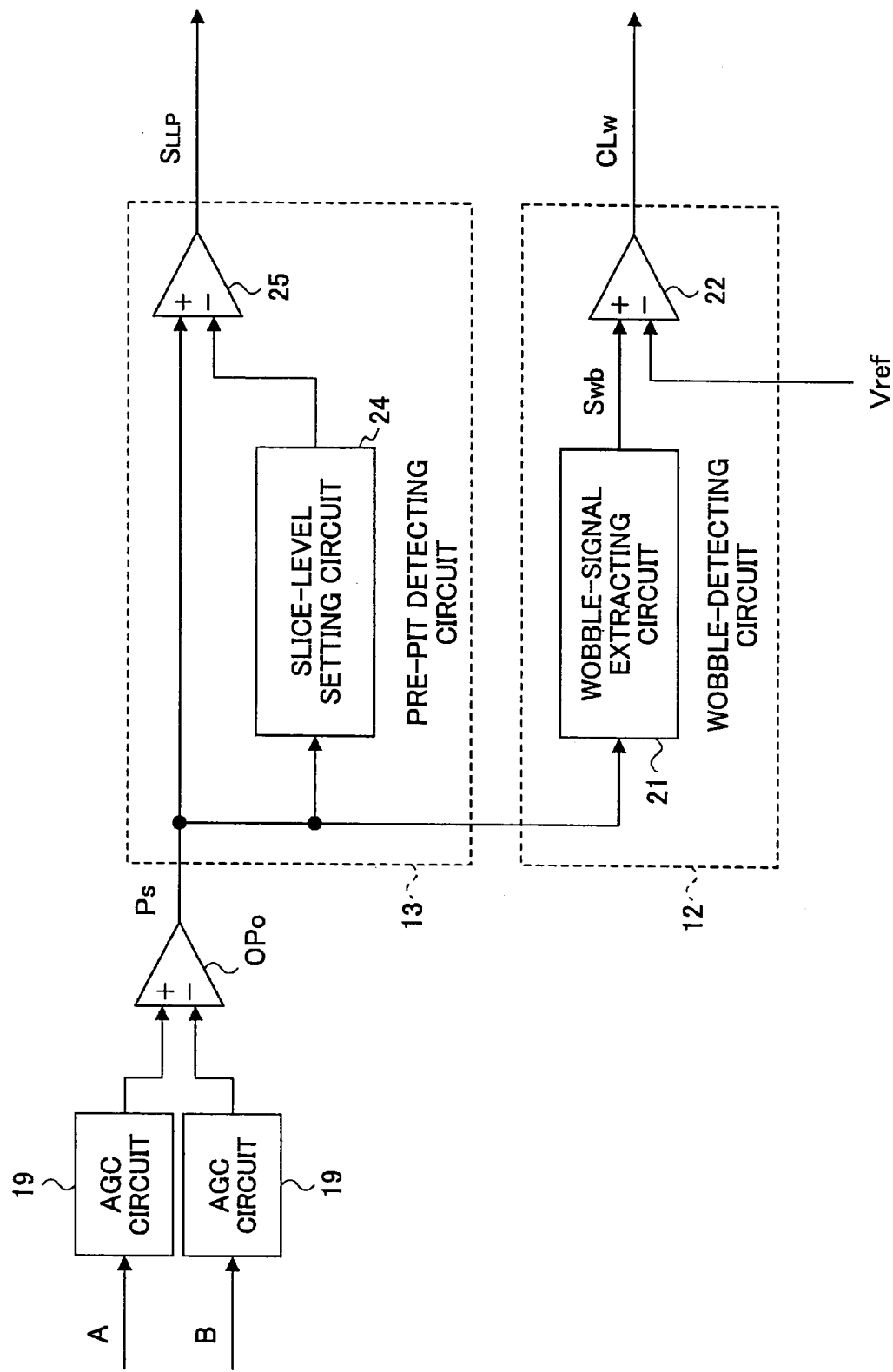
FIG. 5 is a block diagram schematically illustrating a relationship between a wobble-detecting circuit 12 and a pre-pit detecting circuit 13.

FIG. 5 is a block diagram schematically illustrating a relationship between a wobble-detecting circuit 12 and a pre-pit detecting circuit 13.

To the respective output signals A, B from the corresponding optical-detecting regions 26a, 26b in the optical-detecting device 26 of the optical pickup 3, corresponding Automatic Gain Control (AGC) circuits 19 are applied so as to make the amplitudes of the signals constant.

While the difference between the output amplitudes of the output signals A and B may be caused by variations in the outputs of the optical-detecting elements of the optical-detecting regions 26a, 26b, decentering and axial runout of the optical disk 2, and variation in the lens position of the optical pickup 3, etc., making the amplitudes constant with the AGC circuits 19 enables obtaining of a push-pull signal Ps in which the same-phase RF-signal component has been efficiently eliminated at the time of having passed through the subtractor using the operational amplifier OP0. Then, the push-pull signal Ps is fed into each of the wobble-detecting circuit 12 and the pre-pit detecting circuit 13.

The wobble-detecting circuit 12, provided with a wobble-signal extracting circuit 21 and a wobble-comparator 22 using an operational amplifier, feeds the push-pull signal Ps into the wobble-signal extracting circuit 21 so as to extract the wobble signal $S_{wb}$, and binarize the wobble signal $S_{wb}$ with the wobble comparator 22 so as to output the wobble clock CLw.

In the clock-generating circuit 11 illustrated in FIG. 1, with an internal PLL circuit, based on the wobble clock CLw, generating of a clock for the encoder 7 and generating of a clock for the servo circuit 10 are performed, and data are made to be recorded on the optical disk 2 at a constant linear velocity.

Moreover, in order to start recording at a desired disk position, position information is needed so that the pre-pit LPP has the address information recorded for such purpose.

The pre-pit detecting circuit 13, a circuit for binarizing the prepit-signal $S_{LPP}$ component convoluted in the wobble signal $S_{wb}$ within the push-pull signal Ps so as to detect the pre-pit signal $S_{LPP}$, is provided with a slice-level setting circuit 24 and a pre-pit comparator (comparator circuit) 25 configured with an operational amplifier. The optical disk 2 apparatus according to the invention is characterized by a setting of the slice level in the pre-pit detecting circuit 13.

First Embodiment

Figure 6:
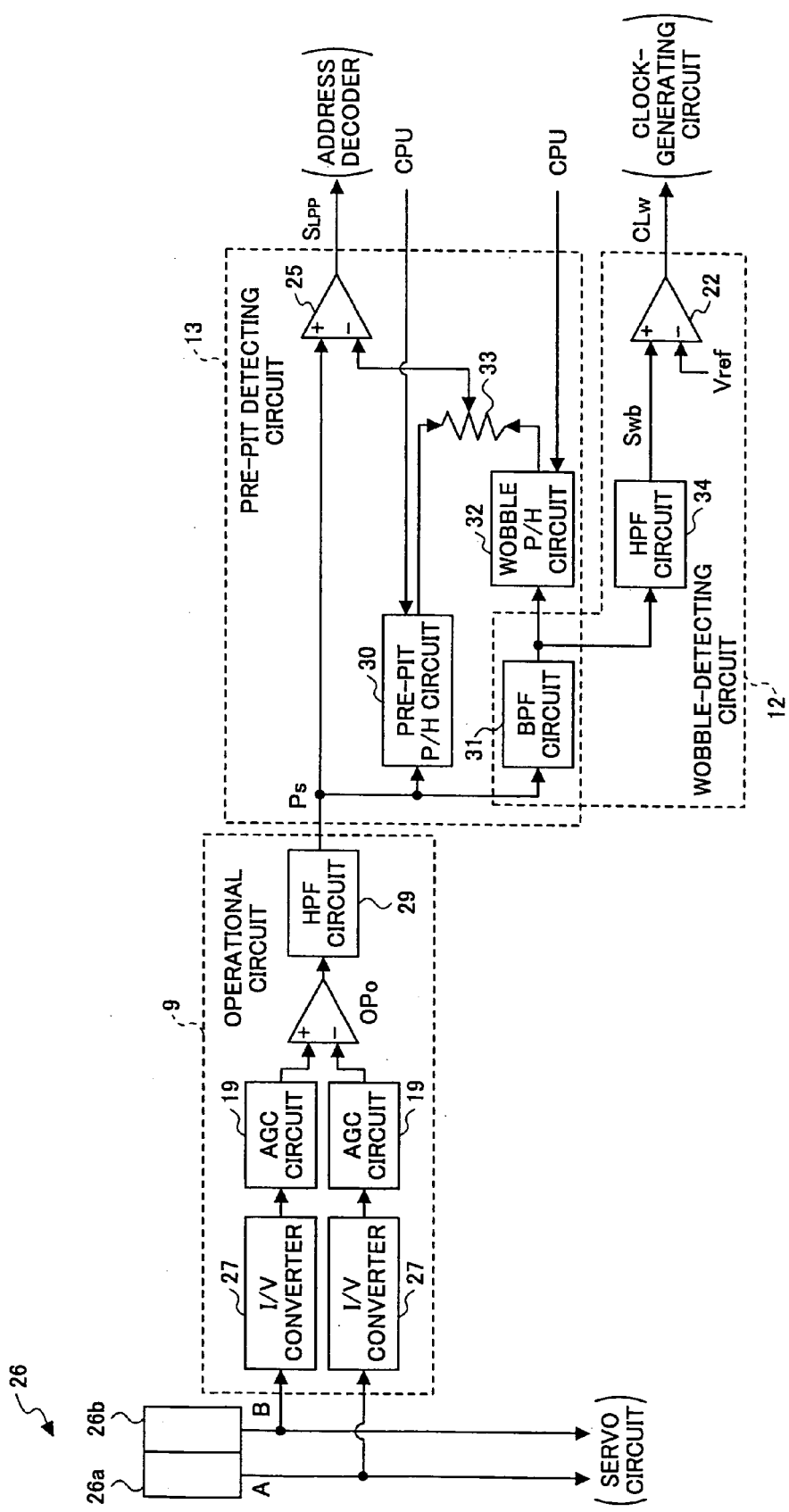
FIG. 6 is a block diagram illustrating a first embodiment of a pre-pit information detecting apparatus according to the invention.

FIG. 6 is a block diagram illustrating a first embodiment of a pre-pit information-detecting apparatus according to the invention. A process of detecting the pre-pit signal and the wobble signal according to the embodiment is described in detail with reference to this diagram.

In FIG. 6, the respective output signals A and B from the two optical-detecting regions 26a, 26b of the optical pickup 3 are output at the operational circuit 9 as the push-pull signal Ps, the pre-pit detecting circuit 13 into which the push-pull signal Ps is fed is controlled by the CPU 6 so as to detect the pre-pit signal $S_{LLP}$ for outputting to the address decoder 14, and then the wobble-detecting circuit 12 into which the push-pull signal Ps is fed generates the wobble clock CLw for outputting to the clock-generating circuit 11.

The optical-detecting device 26 as the optical-detecting section having the optical-detecting regions equally divided into two causes electric currents to be generated at the respective optical-detecting regions 26a, 26b based on the corresponding optically-detected amounts. The respective output signals A, B resulting from the corresponding electric currents are individually fed into two current-voltage converters 27 (I/V converters) within the operational circuit 9 so as to be converted into voltage signals. The corresponding output signals A and B from the respective optical-detecting regions 26a, 26b are also fed into the servo circuit 10 as illustrated in FIG. 1. It is to be noted that the optical-detecting device 26 is not limited to a two-way divided configuration so that it may be divided along the track into four, or even more, parts.

The respective voltage signals converted from the output signals A, B have the corresponding amplitudes made constant with the individual AGC circuits 19, and the respective signals are fed into the subtractor with an operational amplifier $OP_0$ as a difference-detecting circuit so as to obtain a push-pull signal Ps as a difference signal. The push-pull signal Ps, after having the DC component eliminated with a High-Pass Filter (HPF) circuit 29, is output from the operational circuit 9, and then is divided into two signals, each following the corresponding paths for feeding into the pre-pit detecting circuit 13 and the wobble-detecting circuit 12.

The push-pull signal Ps fed into the pre-pit detecting circuit 13 is fed into the pre-pit comparator 25, a pre-pit peak-value detecting circuit (designated as "pre-pit P/H circuit" in FIG. 6) 30, and a band-pass filtering (BPF) circuit 31 shared with the wobble-detecting circuit 12, within the pre-pit detecting circuit 13.

Figure 7:
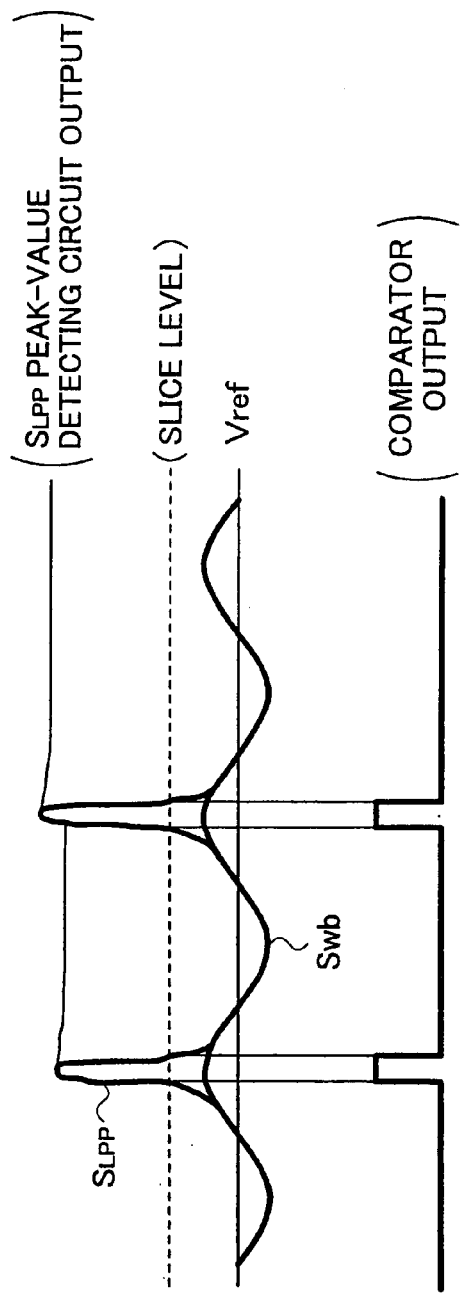
FIG. 7 is a waveform diagram illustrating a relationship between wobble component and pre-pit component and slice level of a push-pull signal, and output of a comparator in a circuit as illustrated in FIG. 6.

The pre-pit peak-value detecting circuit 30, a first peak-value detecting circuit and a first voltage-detecting circuit, detects and holds the peak value, or the maximum-amplitude voltage at the positive side, of the push-pull signal Ps fed as a continuous analog signal. The detected peak value is a value which corresponds to the peak value of the pre-pit signal $S_{LPP}$ component as illustrated in FIG. 7. It is to be noted that, when the pre-pit signal $S_{LPP}$ appears as negative pulses, the polarity of the signal may be caused to be inverted by an inverting circuit, etc., before being fed into the pre-pit peak-value detecting circuit 30. Below a specific example of a configuration for the pre-pit peak-value detecting circuit 30, including control from the CPU 6, is described in detail.

Also the band-pass filtering circuit 31 (below abbreviated as "BPF circuit"), a band-pass filter for the push-pull signal Ps with the wobble-signal frequency as the center frequency, eliminates the pre-pit signal $S_{LPP}$ component from the fed push-pull signal Ps so as to extract the wobble signal $S_{wb}$ component.

This wobble signal $S_{wb}$ is fed into a wobble peak-value detecting circuit (a wobble P/H circuit) 32. The wobble peak-value detecting circuit, a second peak-value detecting circuit and a second voltage-detecting circuit, detects and holds the peak value (the maximum-amplitude voltage at the positive side) of the wobble signal $S_{wb}$ as a continuous analog signal. The peak value of the wobble signal $S_{wb}$, as illustrated in FIG. 7, is a value corresponding to the bottom value of the pre-pit signal $S_{LPP}$, or the minimum value of the pre-pit signal $S_{LPP}$ projecting from the wobble signal $S_{Wb}$. Below, a specific example of a configuration for the wobble peak-value detecting circuit 32 is described in detail.

Then, the peak value of the pre-pit signal $S_{LPP}$ kept in the pre-pit peak-value detecting circuit 30 and the peak value of the wobble signal $S_{Wb}$ kept in the wobble peak-value detecting circuit 32 are made to be fed across the potential divider 33 as the differential potential-dividing circuit so as to divide the difference of the values at a predetermined proportion and feed the divided output voltage as the slice level into a pre-pit comparator 25. Hereby, the slice level, as illustrated in FIG. 7 with a broken line, is set between the maximum and minimum values of the portion of the pre-pit signal $S_{LPP}$ projecting from the wobble signal $S_{Wb}$.

As a result, the pre-pit comparator 25, without being affected by the wobble signal $S_{Wb}$ and even when the maximum amplitude of the pre-pit signal $S_{LPP}$ somewhat varies, is able to stably binarize the push-pull signal Ps so as to output the pre-pit signal $S_{LLP}$ (a comparator output as illustrated in FIG. 7). In the first embodiment, the pre-pit peak-value detecting circuit 30, the BPF circuit 31, the wobble peak-value detecting circuit 32, and the potential divider 33 configure the slice-level setting circuit 24 illustrated in FIG. 5.

It is to be noted that when there is no offset in the phase of (no delay in) the wobble signal $S_{wb}$ output from the BPF circuit 31, the bottom value of the pre-pit signal $S_{LPP}$ and the peak value of the wobble signal $S_{wb}$ appear at the same timing. In other words, as the timing in which the pre-pit signal $S_{LLP}$ is detected and the timing in which the wobble signal $S_{wb}$ is detected correspond, setting of the slice level without providing with the wobble peak-value detecting circuit 32 for holding the peak value is enabled as described above.

Moreover, in lieu of the wobble peak-value detecting circuit 32, an average-voltage detecting circuit for detecting and holding the average voltage of the wobble signal $S_{wb}$ output from the BPF circuit 31 may be provided. In such case, the peak value of the pre-pit signal $S_{LLP}$ kept in the pre-pit peak-value detecting circuit 30 and the average voltage output from the average-voltage detecting circuit are made to be fed across the potential divider 33 as a differential potential-dividing circuit so as to divide the difference at a predetermined proportion and to feed the divided output voltage as the slice level into the pre-pit comparator 25.

In such a way, even when the maximum amplitude of the pre-pit signal $S_{LPP}$ changes due to an effect of decentering of the disk face or a change in the lens position, etc., setting of an appropriate slice level so as to detect the pre-pit signal $S_{LPP}$ is enabled.

On the other hand, in the wobble-detecting circuit 12, the push-pull signal Ps has the pre-pit signal $S_{LPP}$ component eliminated with the BPF circuit 31 shared with the filtering circuit of the pre-pit detecting circuit, and the wobble-signal $S_{wb}$ component extracted. The BPF circuit 31 may be provided separately in the wobble-detecting circuit 12. Then, the extracted wobble-signal $S_{wb}$ component has the DC component eliminated at high precision with the high-pass filtering (HPF) circuit 34 so as to become the wobble signal $S_{wb}$ and then to be compared with a reference voltage Vref so as to generate a wobble clock for outputting to the clock-generating circuit 11.

In this embodiment, the BPF circuit 31 and high-pass filtering circuit 34 configure the wobble-signal extracting circuit 21 illustrated in FIG. 5.

According to the configuration illustrated in FIG. 6, stable detecting of the pre-pit signal $S_{LPP}$ and the wobble clock is enabled.

Figure 9:
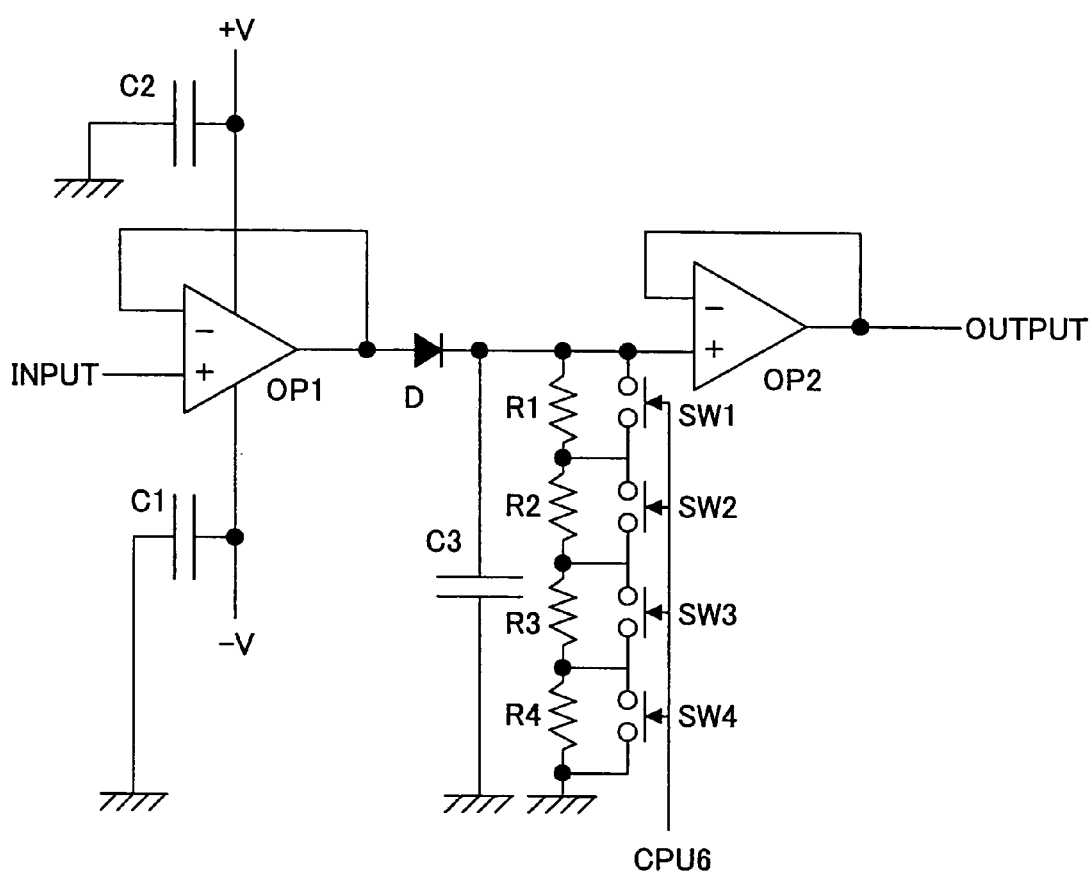
FIG. 9 is a circuit diagram illustrating a specific example of a configuration of a pre-pit peak-value detecting circuit 30 and a wobble peak-value detecting circuit 32.

Now, a specific example of a configuration of the pre-pit peak-value detecting circuit 30 and the wobble peak-value detecting circuit 32 is described in detail. FIG. 9 is a circuit diagram illustrating the specific example of the configuration. The circuit configuration is identical for the pre-pit peak-value detecting circuit 30 and the wobble peak-value detecting circuit 32 so that the description herein simply refers to the peak-value detecting circuits 30, 32.

While the peak-value detecting circuits 30, 32, configuring a maximum-amplitude holding circuit (a peak-holding circuit) for holding the input maximum-amplitude voltage at a capacitor, are to be designed individually for the rate of charging the capacitor with electrical charges and for the rate of discharging the electrical charges, generally the rates end up having a correlation. In other words, having to lower the changing rate due to the discharging of the voltage held (called the drop rate) so as to allow for as long a holding period as possible inevitably causes the rate of the charging to be slower to some extent.

In a case of a pre-pit signal of the DVD-R/RW, while the first 3 wobbles from the top of the frame correspond to one bit, the time interval up to an arrival of the next one bit is approximately 2 frames, corresponding to approximately 3000 TCs (TC being the period of the channel bit of the DVD). On the other hand, as the pulse width of the pre-pit signal is approximately several TCs (in the DVD-R/RW specifications, the half-power width of 1 TC or more), in order to achieve the peak-holding of the pre-pit signal component, there are conflicting requirements of the high rate of charging and the low rate of discharging.

Furthermore, in order to keep increasing the rate of recording into the optical disk, a circuit enabled to accurately detect the peak level is required. Therefore, in a peak-value detecting circuit for a pre-pit signal, while the rate of charging needs to be further increased as the charging period is shortened, as the time interval up to the next pre-pit signal becomes short, the change rate (the drop rate) may be increased to compensate for the shortened time interval.

Figure 8:
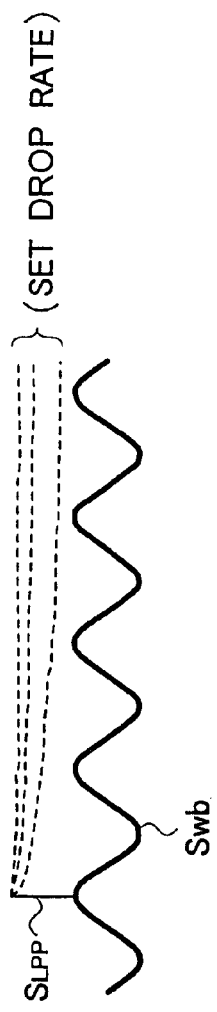
FIG. 8 is a waveform diagram illustrating differences in multiple drop rates in a peak-value detecting circuit.

Thus, in this embodiment, at least one of the peak-value detecting circuits 30, 32 (the pre-pit peak-value detecting circuits 30) is enabled to set multiple drop rates as illustrated in FIG. 8 and to set the larger drop rate the higher the recording rate.

Moreover, the respective peak-value detecting circuits 30,32 are made to have the function of resetting the peak level. As the amplitude of the pre-pit signal varies depending on the individual optical disk unit and as the drop rate of the pre-pit peak-value detecting circuit 30 is set to be significantly small and the peak level of the pre-pit signal is held for a long time period, the function enables resetting of the detected voltage so as to be appropriately set again when the optical disk is replaced.

The peak-value detecting circuit as illustrated in FIG. 9, configured to be responsible for these functions, is provided with three capacitors C1, C2, and C3, two operational amplifiers OP1, OP2, a diode for rectifying D, four resistors R1 through R4, and four switches SW1 through SW4. These configure two voltage-follower circuits for converting input and output impedances, a charging circuit with the diode for rectifying D and the capacitor C3 for holding, a discharging circuit with the resistors R1 through R4 and the switches SW1 through SW4, and a drop-rate setting section and a resetting section.

In the peak-value detecting circuit, the input signal (the push-pull signal Ps or the wobble signal $S_{wb}$) is fed into the first-stage voltage follower configured with the operational amplifier OP1 and the output voltage charges the capacitor C3 for holding via the diode D for rectifying. The charges accumulated in the capacitor C3, when none of the resistors R1 through R4 and of the switches SW1 through SW4 exist, without flowing into the operational amplifier OP2 or flowing back into the diode D, remain in the state of being accumulated.

However, in actuality, as an in-series resistor R1 through R4 circuit and the discharging circuit with the switches SW1 through SW4 connected in parallel with the respective resistors are provided, the charges accumulated in the capacitor C3 are discharged with the discharging circuit, so that the discharging rate (the drop rate) of the capacitor C3 becomes larger the smaller the discharging-time constant, which is the product of the capacitance of the capacitor C3 and the combined resistance value of the resistors out of the resistors R1 through R4 that are not short-circuited by the switches SW1 through SW4, causing a discharge at a high discharging rate. Therefore, changing the number of opening/closing of the switches SW1 through SW4 as the drop-rate selecting section enables changing the combined resistance value so as to change the drop rate.

As a specific example of an operation, when the recording rate (the relative rate between the optical disk 2 and the optical pickup 3 in FIG. 1) is low, with an instruction by the CPU 6, all of the switches SW1 through SW4 are opened so that the combined resistance value R is set to be the sum of the respective resistance values of the resistors R1 through R4 (R1+R2+R3+R4). Then, as the rate of recording increases, the switches are closed one by one sequentially so that, for example, when only the switch SW1 is closed, the drop rate is set to be in accordance with the product of the capacitance of the capacitor C3 and the combined resistance value R=R2+R3+R4, as the discharging would be through the switch SW1 with a zero resistance value without passing through the resistor R1. Furthermore, when the recording rate is increased, the CPU 6 closes the switches further so that the combined resistance value R is set to be smaller such as R=R3+R4 and then R=R4. Thus, the discharging-time constant is made smaller the larger the recording linear velocity so as to cause a large drop rate and to quicken the discharging.

As a result, more accurate detecting of the peak level of the pre-pit signal and the wobble signal is enabled. Also, when the CPU 6 closes all the switches SW1 through SW4, the capacitor for holding C3 is short-circuited across its terminals so that the charges accumulated in the capacitor C3 are discharged instantaneously and the holding voltage of the peak value is reset.

Therefore, the switches SW1 through SW4 in the embodiment function as both the drop-rate changing section for selecting multiple setting values as the drop rates of the holding voltage and the resetting section for resetting the detected voltage at the desired timing.

It is noted that as a configuration of the switches SW1 through SW4, not only a mechanical contact switch but also a semiconductor switch such as a photo-MOS relay may be used so as to enable easy control. Moreover, while the circuit example is provided with multiple resistors each having a fixed resistance value, a variable resistor having the resistance value varying according to the instruction of the CPU 6 may be used so as to control the discharging time and to select the drop rate. Furthermore, instead of or in addition to the multiple resistors, providing of multiple in-parallel connected capacitors and increasing/decreasing the number of capacitors (the combined capacitance) causing the charges to be accumulated with opening/closing of the switches so as to change the drop rate may be performed. In other words, the fact that at least one of the capacitance of the capacitor for holding and the resistance value of the discharging circuit is variable suffices.

It is noted that as a configuration of the switches SW1 through SW4, not only a mechanical contact switch but also a semiconductor switch such as a photo-MOS relay may be used so as to enable easy control. Moreover, while the circuit example is provided with multiple resistors each having a fixed resistance value, a variable resistor having the resistance value varying according to the instruction of the CPU 6 may be used so as to control the discharging time and to select the droop rate. Furthermore, instead of or in addition to the multiple resistors, providing of multiple in-parallel connected capacitors and increasing/decreasing the number of capacitors (the combined capacitance) causing the charges to be accumulated with opening/closing of the switches so as to change the droop rate may be performed. In other words, the fact that at least one of the capacitance of the capacitor for holding and the resistance value of the discharging circuit is variable suffices.

Second Embodiment

Figure 10:
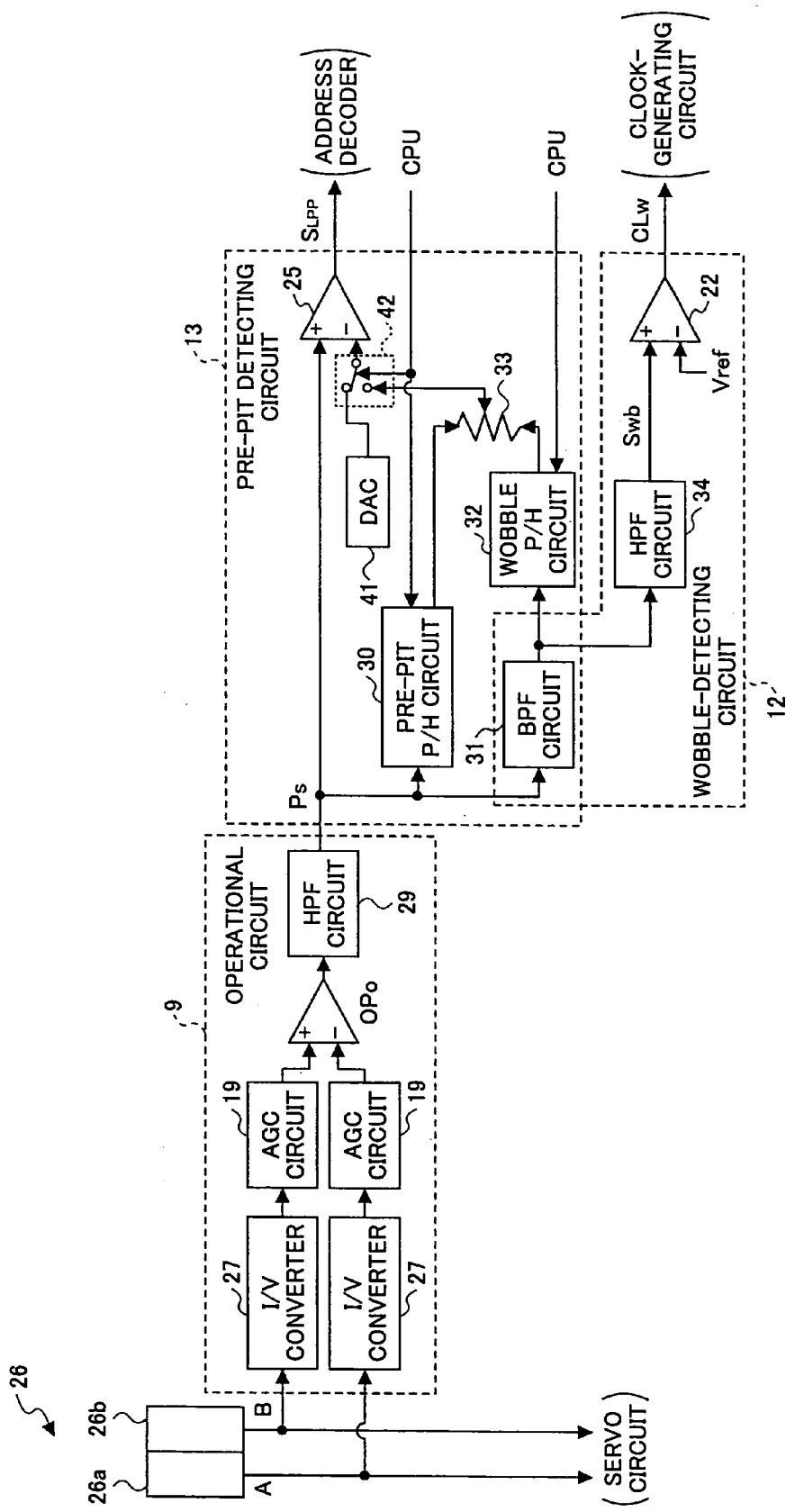
FIG. 10 is a block diagram similar to FIG. 6 illustrating a second embodiment of the pre-pit information-detecting apparatus according to the invention.

Next, a second embodiment of the pre-pit information-detecting apparatus according to the invention is described. FIG. 10 is a circuit diagram similar to FIG. 6 so that the same letters are given for those parts corresponding to FIG. 6.

In the embodiment, as only the pre-pit detecting circuit 13 differs from the first embodiment as described above, only the differences are described.

In other words, within the pre-pit detecting circuit 13, a D/A converter circuit (DAC) 41 for enabling setting of multiple DC voltages for outputting, and a selecting switch 42 as a selecting section controlled with the CPU 6 as illustrated in FIG. 1 are provided.

Then, the CPU 6 switching and controlling the selecting switch 42 enables selecting either one of the output voltage of the potential divider 33 and the output voltage of the D/A converter circuit 41 as the comparing signal or the slice-level signal so as to be made to be input to the comparator 25 for comparing with the push-pull signal Ps as the differential signal.

Thus, when switching the selecting switch 42 to the D/A converter circuit 41 side, fixing the slice level is enabled. Thereby, at the time of seeking and of high-speed recording of the optical pickup, etc., even when detecting of the peak value of the pre-pit signal cannot be performed correctly, stable performing of setting the slice level and detecting the pre-pit signal $S_{LPP}$ is enabled.

Other configurations and functions are the same as those of the first embodiments so that the descriptions are omitted.

Third Embodiment

Figure 11:
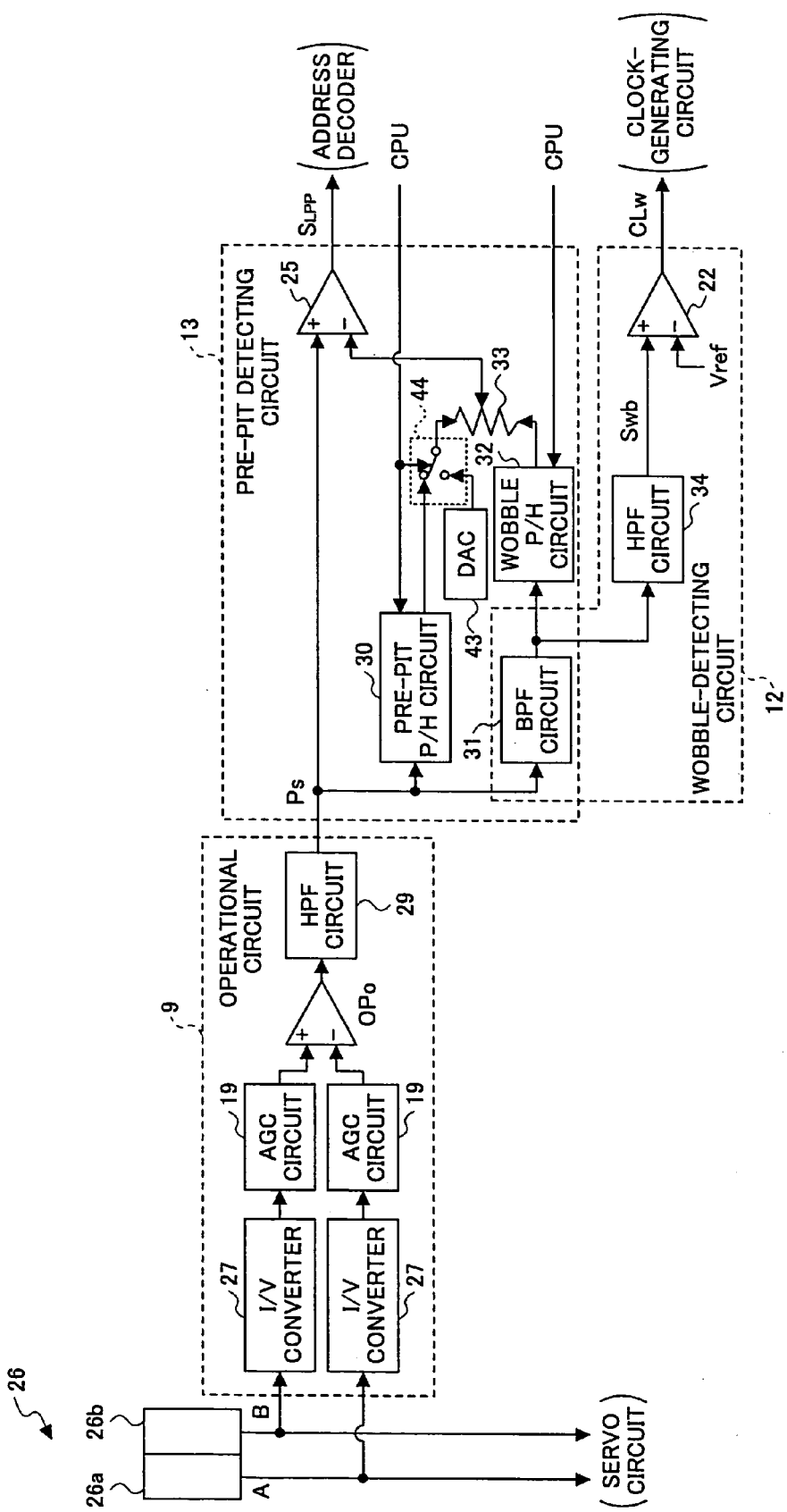
FIG. 11 is a block diagram similar to FIG. 6 illustrating a third embodiment of the pre-pit information-detecting apparatus according to the invention.

Next, a third embodiment of the pre-pit information-detecting device according to the present invention is described. FIG. 11 is a diagram similar to FIG. 6 so that the same letters are given to those parts corresponding to FIG. 6.

Also in the embodiment, as only the pre-pit detecting circuit 13 is different from the first embodiment as described above, only the differences are described.

In other words, within the pre-pit detecting circuit 13, there are a D/A converter circuit (DAC) 43 for enabling setting of multiple voltages for outputting, and a selecting switch 44 as a selecting section controlled with the CPU 6 as illustrated in FIG. 1.

Then, the CPU 6 switching and controlling the selecting switch 44 enables selecting either of the output voltage of the pre-pit peak-value detecting circuit 30 and the output voltage of the D/A converter circuit 43 so as to be fed to a terminal of a potential divider 33, the terminal being the other one of the terminals of the potential divider whose one terminal is fed the output voltage of a wobble peak-value detecting circuit 32.

Therefore, when the selecting switch 44 is switched to the D/A converter circuit 43 side, the potential divider 33 divides the difference between the output voltage of the D/A converter circuit 43 and the output voltage of the wobble-peak value detecting circuit 32 so that the divided voltage as a comparing signal or a slice-level signal can be fed to the comparator 25 for comparing with the push-pull signal Ps as a differential signal.

In this case, setting the slice level depending on the amplitude variation of the wobble signal $S_{wb}$ component is enabled. Thereby, at the time of the seek and the high-speed recording of the optical pickup, even when the detecting of the peak value of the pre-pit signal $S_{LPP}$ cannot be performed correctly, stable performing of setting of the slice level and detecting of the pre-pit signal $S_{LPP}$ is enabled. Moreover, relative to the second embodiment, as having to change the slice level in proportion to the amplitude of the wobble signal $S_{wb}$ component is enabled, a more stable detecting of the pre-pit signal $S_{LPP}$ is enabled. Furthermore, herein the output voltage of the wobble peak-value detecting circuit 32 may be set to a certain fixed voltage.

Other configurations and functions are the same as those in the first embodiment as described above so that the descriptions are omitted.

Flowchart Description of Operation

Next, a process at the time of the seek operation in the optical-disk apparatus provided with the pre-pit information-detecting apparatus, according to the second or the third embodiment as described above, is described. FIGS. 12 through 15 are flowcharts illustrating the process of performing the seek operations according to the respective embodiments, each illustrating the flow of the basic seek process and of the seek process having added the resetting process in the respective embodiments.

It is to be noted that the processes illustrated in these flowcharts illustrate the procedures for the CPU 6 illustrated in FIG. 1, processing according to a program stored in an internal memory. Moreover, in these flowcharts, each processing step is designated as S.

Figure 12:
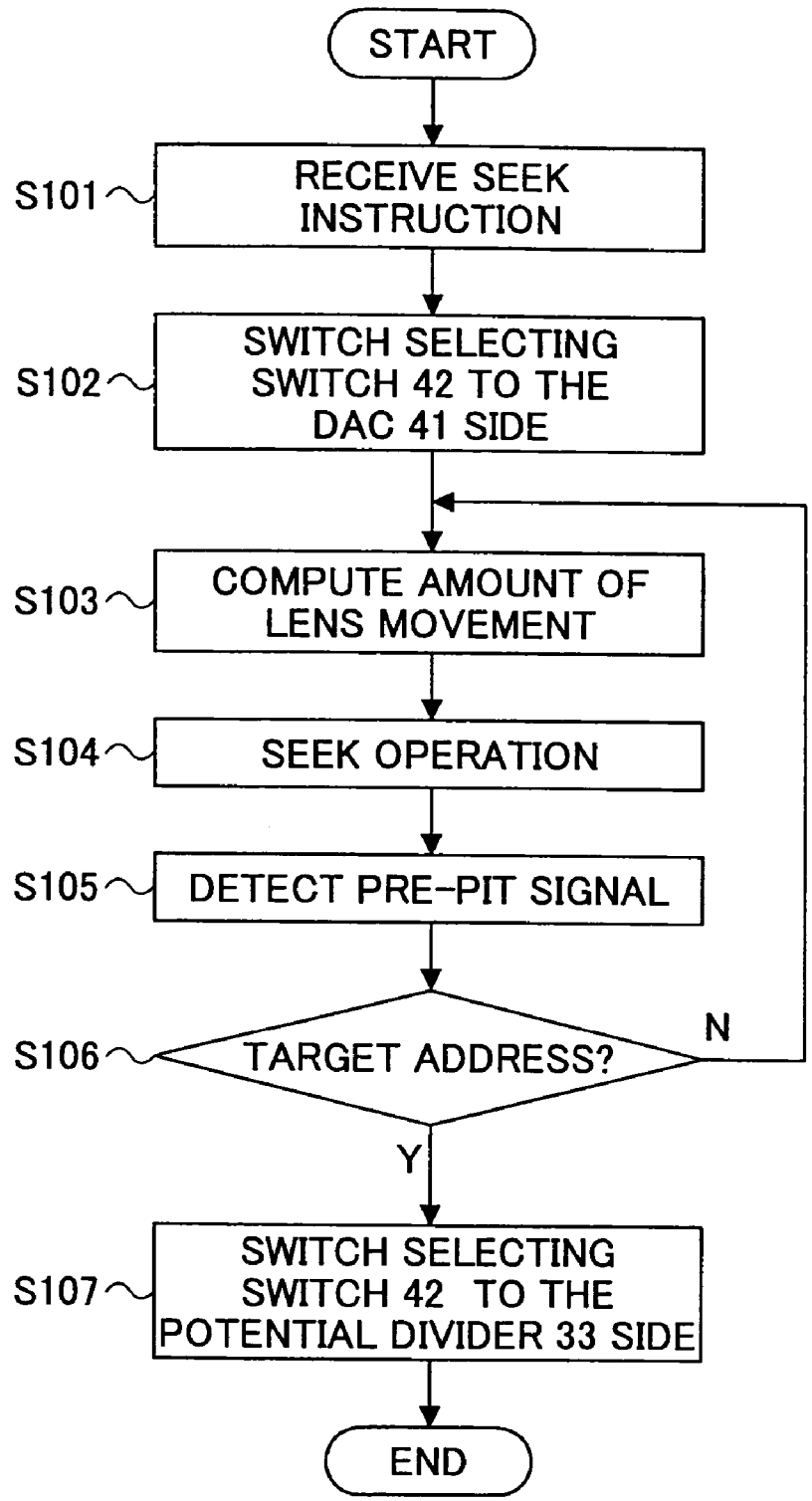
FIG. 12 is a flow diagram illustrating a basic seek operation process in an optical-disk apparatus provided with the pre-pit information detecting apparatus as illustrated in FIG. 10.

First with reference to FIG. 12, a process of the basic seek operation in the optical-disk apparatus provided with the pre-pit information-detecting apparatus of the second embodiment as illustrated in FIG. 10 is described.

Once this process begins, first in step 101, a seek instruction (including the address, etc., of the seek target) is received from the host-computing apparatus, etc., and then the process proceeds to step 102 in which the selecting switch 42 illustrated in FIG. 10 is switched to the D/A converter circuit (DAC) 41 side so as to set the slice level to a fixed level.

Next, the process proceeds to step 103 in which the amount of movement of the objective lens within the optical pickup 3, or the amount of movement of the optical pickup 3, is computed from the address in which the current beam spot exists and the target address, and in step 104 an instruction is presented to the servo circuit 10 in FIG. 1 so as to cause performing of a seek operation based on the computed amount of movement. The servo circuit 10, upon receiving the instruction, drives the seek mechanism including the motor for tracking to move the optical pickup 3 by the instructed amount of movement in the radial direction of the optical disk 2 so as to perform the seek operation.

Based on this seek operation, when it is determined that the beam spot has approached the vicinity of the target address, the process proceeds to step 105 in which the pre-pit signal is detected. The detecting of the pre-pit signal at this time is performed with the output voltage of the D/A converter circuit (DAC) 41 as the slice level.

Then, in step 106, it is determined whether the address information with the detected pre-pit signal is the target address, and if it is not the target address, the process returns to step 103 and the operation up to step 106 is repeatedly performed until the target address is detected.

In step 106 when it is determined to be the target address, at step 107 the selecting switch 42 is switched to the potential divider 33 side so that the process ends, so that the subsequent pre-pit signal is detected with the voltage divided by the potential divider 33 as the slice level.

As in the above, when performing a seek operation to move the optical pickup 3 to a random target address on the optical disk 2, the selecting switch 42 is switched to the D/A converter circuit (DAC) 41 side and at the completion of the seek switched to the potential divider 33 side, setting the respective slice levels.

Usually, during the seek operation, as the beam spot Sp moves in the direction orthogonal to the track 17, the push-pull signal Ps inevitably ends up being perturbed, so that as a result, the pre-pit peak-value detecting circuit 30 detects an inappropriate level, so as to make appropriate setting of the slice level not possible. However, according to the embodiment, during such seek operation, setting of the slice level to an appropriate fixed level is enabled and detecting of an appropriate pre-pit signal is enabled, making possible a stable access.

Next, a process of the basic seek operation in the optical-disk apparatus provided with the pre-pit information-detecting apparatus according to the third embodiment as illustrated in FIG. 11 is described with reference to FIG. 13.

Figure 13:
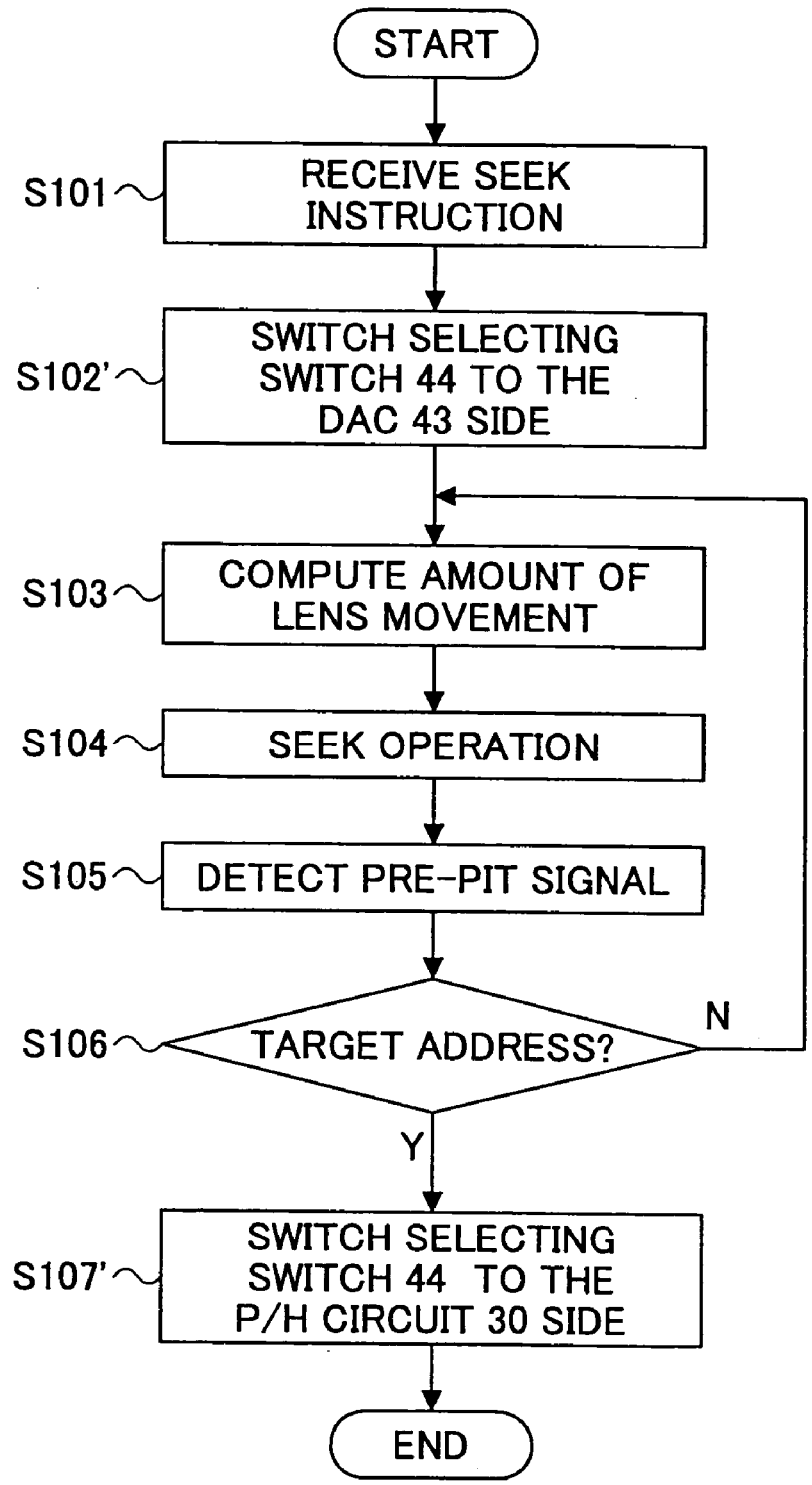
FIG. 13 is a flow diagram illustrating a basic seek operation process in the optical-disk apparatus provided with the pre-pit information-detecting apparatus as illustrated in FIG. 11.

In the flowchart of FIG. 13, only steps 102' and 107' differ from the flowchart in FIG. 12 as described above. In step 102', the selecting switch 44 as illustrated in FIG. 1 is switched to the D/A converter circuit (DAC) 43 side and the voltage, resulting from dividing with the potential divider 33 the difference between the output voltage of the D/A converter circuit (DAC) 43 and the output voltage of the wobble peak-value detecting circuit 32, is set as the slice level.

Also, in step 107', the selecting switch 44 is switched to the pre-pit peak-value detecting circuit 30 side and the voltage, resulting from dividing with the potential divider 33 the difference between the output voltage of the pre-pit peak-value detecting circuit 30 and the output voltage of the wobble peak-value detecting circuit 32, is set as the slice level.

As the process for other steps are the same as in the corresponding steps described in FIG. 12, the description is omitted. The advantages of this case are as described at the end of the description in FIG. 11.

Figure 14:
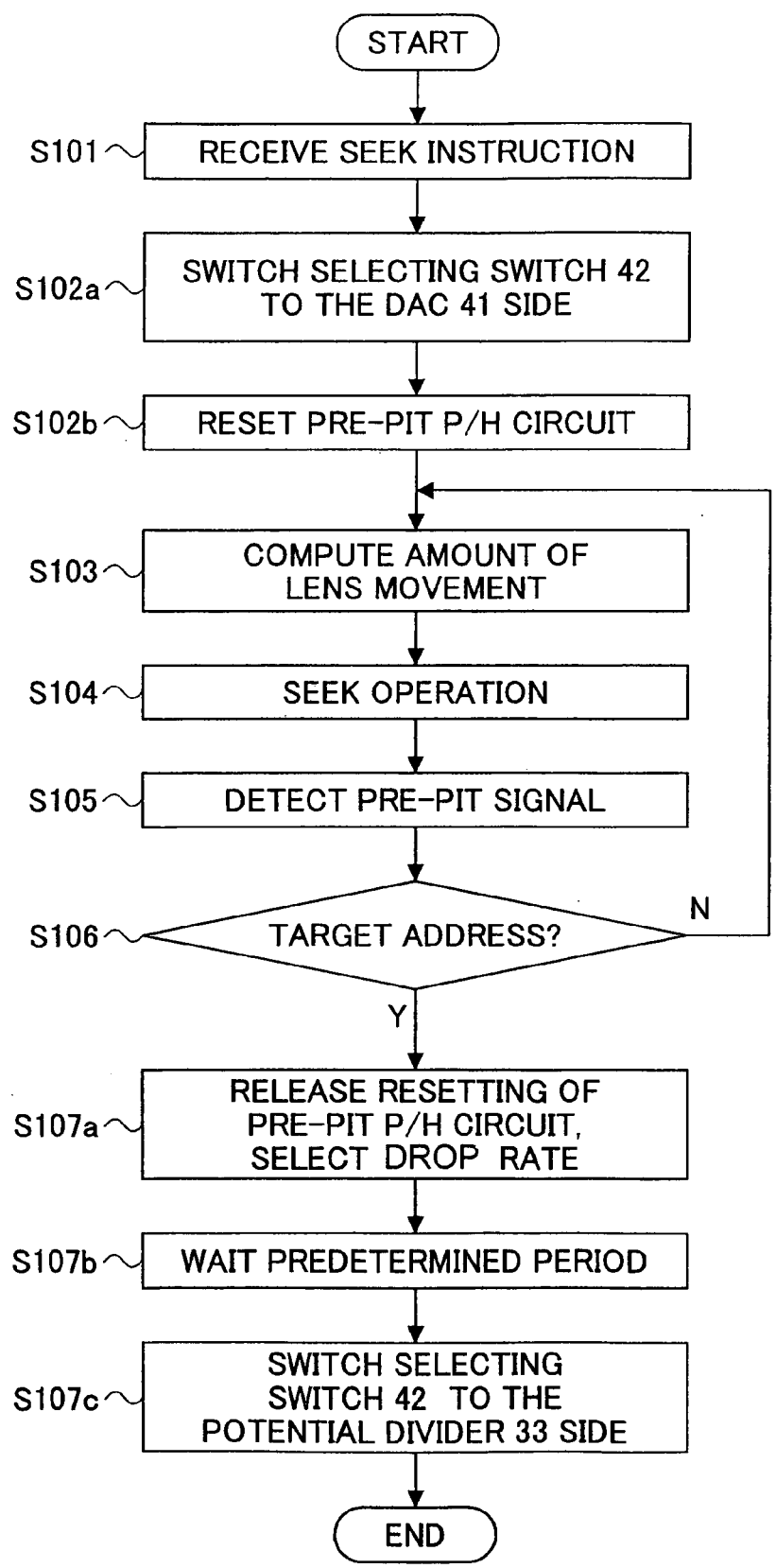
FIG. 14 is a flow diagram illustrating a seek operation process having added a reset operation in the optical-disk apparatus provided with the pre-pit information-detecting apparatus as illustrated in FIG. 10.

Next, the process at the time of the seek operation as described with reference in FIG. 12, further having added the resetting operation, is described with reference to a flowchart as illustrated in FIG. 14. It is to be noted that in FIG. 14 the steps performing the same process as the respective steps illustrated in FIG. 12 are given the same step numbers. Also, step 102a and step 107c are the same as the step 102 and the step 107, respectively, so that the descriptions of these steps are omitted.

Now, what is different from the process described in FIG. 12 is that after switching the selecting switch 42 to the D/A converter circuit 41 side in step 102a, in step 102b the pre-pit peak-value detecting circuit 30 is reset. At this time the wobble peak-value detecting circuit 32 may be reset. In other words, in the case of using the circuit as illustrated in FIG. 9, closing (turning on) all the switches SW1 through SW4 short-circuits both terminals of the capacitor C3 and instantaneously discharges the charges held in the capacitor C3 so as to reset the peak-value voltage.

Then, while keeping this reset state, seek operations are performed in the loop process of steps 103 through 106 until the target address is detected, and, when in step 106 the target address is detected, the process proceeds to step 107a in which, depending on the recording rate (the relative rate between the optical disk 2 and optical pickup 3 in FIG. 1), the switches SW1 through SW4 are selectively opened (turned off) so as to release the reset state while at the same time to select the change rate (the drop rate) of the held voltage.

Hereby, the respective capacitors C3 of the pre-pit peak-value detecting circuit 30 and the wobble peak-value detecting circuit 32 are enabled to detect and hold a new peak-value voltage. Then, when, in step 107*b*, during a predetermined wait period in which charges are accumulated in the capacitor C3 so that the new peak-value voltage is detected and held, in step 107*c*, the selecting switch 42 is switched to the potential divider 33 side so that the use of the D/A converter circuit 41 is ceased and the process is terminated.

In this way, there are the following advantages when, during the seek operation, at least the pre-pit peak value detecting circuit 30 is maintained in the reset state or also the wobble peak-value detecting circuit 32 is kept in the reset state.

Usually, during the seek operation, due to the reasons as described above, it may end up in detecting and holding an inappropriately high peak-value voltage. Therefore, while remaining in such a state, even if trying to switch the selecting switch 42 so as reset the slice level, the normal push-pull signal Ps is not able to exceed such a peak-value so that the abnormal peak-value remains to be held, resulting in a likelihood of not being able to set an appropriate slice level, so that the pre-pit signal cannot be detected.

On the other hand, when performing the reset operation with the procedure such as the process as described above, the perturbed signal detected at the time of the seek operation at least prevents the pre-pit peak-value signal-detecting circuit 30 from having to hold an abnormal level, enabling an appropriate detecting of the pre-pit and thereby a stable access.

Figure 15:
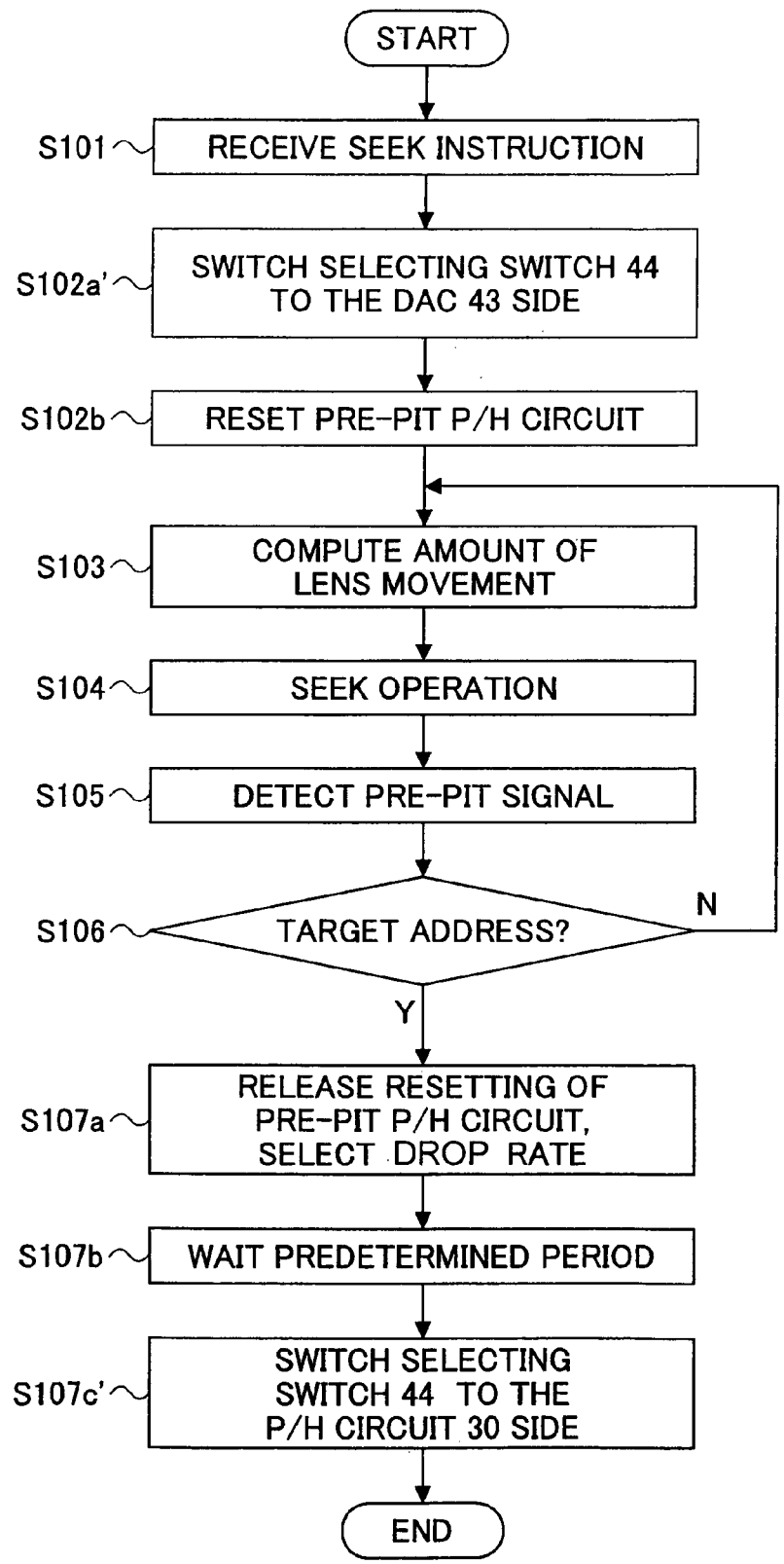
FIG. 15 is a flow diagram illustrating the seek operation process having added the reset operation in the optical-disk apparatus provided with the pre-pit information-detecting apparatus as illustrated in FIG. 11.

Next, a flowchart is illustrated in FIG. 15 in which the process at the seek operation described in FIG. 13 having added a reset operation is illustrated. It is to be noted that in FIG. 15 the steps performing the same operations as the respective steps in FIG. 13 and FIG. 14 are given the same step numbers. Moreover, steps 102*a*' and 107C' in FIG. 15 are the same as the steps 102' and 107' so that the descriptions of the processes with reference to this flowchart are omitted.

It is to be noted that even in the optical-disk apparatus provided with the pre-pit information-detecting apparatus according to the first embodiment illustrated in FIG. 6, if the peak-value detecting circuit illustrated in FIG. 9 is used as the pre-pit peak-value detecting circuit 30 and the wobble-peak value detecting circuit 32, a process may be performed in which the pre-pit peak-value detecting circuit 30 is reset with the step 102*b* in the flowcharts in FIG. 14 and FIG. 15, or at the same time that the wobble peak-value detecting circuit 32 is reset.

Moreover, a process may be performed in which, with step 107*a*, at least the reset state of the pre-pit peak-value detecting circuit 30 is released as well as the change rate (the drop rate) of the held voltage is selected, or at the same time the reset state of the wobble peak-voltage detecting circuit 32 is released so as to select the drop rate of the held voltage.

The present application is based on the Japanese Priority Application No. 2003-406978 filed on Dec. 5, 2003, the entire contents of which are hereby incorporated by reference.

The invention claimed is:

1. An apparatus for detecting pre-pit information, comprising:
    an optical pickup configured to irradiate a light beam onto an optical-information recording medium having guiding grooves to be an information-recording track and pre-pits preset in between the guiding grooves;
    an optical-detecting section configured to optically detect said light beam reflected at said optical-information recording medium, having at least two optical-detecting regions divided across said track;
    a difference-detecting circuit configured to detect a difference between respective signals output from said two optical-detecting regions of the optical-detecting section;
    a first peak-value detecting circuit configured to detect and output a peak value of a signal output from the difference-detecting circuit;
    a filtering circuit configured to extract a signal based on wobble of said guiding grooves from the signal output at said difference-detecting circuit;
    a second peak-value detecting circuit configured to detect and output a peak value of a signal output from the filtering circuit;
    a differential potential-dividing circuit configured to divide at a predetermined proportion and output a difference between the output value of said first peak-value detecting circuit and the output value of said second peak-value detecting circuit; and
    a comparator configured to compare the output of said difference-detecting circuit and the output of said differential potentially-dividing circuit so as to output information regarding said pre-pits,
    wherein at least one of said first peak-value detecting circuit and said second peak value detecting circuit is made of a maximum-amplitude holding circuit for holding a maximum-amplitude voltage and includes a drop-rate selecting section for selecting multiple setting values as drop rates of the holding voltage.

2. The apparatus for detecting pre-pit information as claimed in claim 1, wherein said filtering circuit comprises a band-pass filter having as its center frequency a frequency of a wobble signal detected in accordance with a wobble of said guiding grooves formed in said optical-information recording medium.

3. An apparatus for recording optical information, comprising the apparatus for detecting pre-pit information as claimed in claim 1, having a configuration for detecting an address of a beam-spot position on the optical-information recording medium based on the information regarding the pre-pits that is detected by the apparatus for detecting pre-pit information.

4. An apparatus for detecting pre-pit information, comprising:
    an optical pickup configured to irradiate a light beam onto an optical-information recording medium having guiding grooves to be an information-recording track and pre-pits preset in between the guiding grooves;
    an optical-detecting section configured to optically detect said light beam reflected at said optical-information recording medium, comprising at least two optical-detecting regions divided across said track;
    a difference-detecting circuit configured to detect a difference between respective signals output from said two optical-detecting regions of the optical-detecting section;

a first voltage-detecting circuit configured to detect and output a peak voltage of a difference signal output from the difference-detecting circuit;

a filtering circuit configured to eliminate from said difference signal a detected pre-pit component;

a second voltage-detecting circuit configured to detect and output a peak voltage or average voltage of a signal output from the filtering circuit;

a differential potential-dividing circuit configured to divide at a predetermined ratio and output a difference between the output voltage of said first voltage-detecting circuit and the output voltage of said second voltage-detecting circuit; and a comparator configured to compare said difference signal and output voltage of said differential potential-dividing circuit so as to output information regarding said pre-pits, wherein at least one of said first voltage-detecting circuit and said second voltage-detecting circuit is made of a maximum-amplitude holding circuit for holding a maximum-amplitude voltage and includes a drop-rate selecting section for selecting multiple setting values as drop rates of the holding voltage.

5. The apparatus for detecting pre-pit information as claimed in claim 4, wherein said filtering circuit comprises a band-pass filter having as its center frequency a frequency of a wobble signal detected in accordance with a wobble of said guiding grooves formed in said optical-information recording medium.

6. The apparatus for recording optical information as claimed in claim 4, wherein at least said first voltage-detecting circuit is made said maximum-amplitude holding circuit, and said drop-rate selecting section has a function of making the setting values of said drop rates larger the higher a linear velocity of said track when said optical-information recording medium is rotated.

7. The apparatus for recording optical information, comprising the apparatus for detecting pre-pit information as claimed in claim 4, having a configuration for detecting an address of a beam-spot position on the optical-information recording medium based on the information regarding the pre-pits that is detected by the apparatus for detecting pre-pit information.

8. The apparatus for recording optical information as claimed in claim 7, wherein at least one of said first voltage-detecting circuit and said second voltage-detecting circuit includes a resetting section for resetting the detected voltage at a desired timing.

9. The apparatus for recording optical information as claimed in claim 8, comprising a recognizing section configured to recognize a replacing of the optical-information recording medium, wherein said resetting section has a configuration for resetting said detected voltage every time the recognizing section recognizes the replacing of said optical-information recording medium.

10. The apparatus for recording optical information as claimed in claim 7, further comprising a D/A converter circuit configured to set multiple voltages enabled for outputting and a selecting section configured to select as a comparing signal to be input to said comparator for comparing with said difference signal either one of the output voltage of said differential potential-dividing circuit and the output voltages of said D/A converter circuit.

11. The apparatus for recording optical information as claimed in claim 10, wherein said selecting section has a function of selecting an output voltage of said D/A converter circuit set to a predetermined voltage at time of seek operations for a predetermined position on said optical-information recording medium and selecting the output voltage of said differential potential-dividing circuit after completion of the seek operation.

12. The apparatus for recording optical information as claimed in claim 10, further comprising:

a releasing section configured to reset at least the detected voltage of said first voltage-detecting circuit during seek operations for a predetermined position on said optical—information recording medium and to release said reset state after completing the seek operations, wherein the output voltage of said differential potential-driving circuit is selected by said selecting section after an elapsing of a predetermined period after said reset state is released by said releasing section.

13. A computer readable program product having instructions embodied therein for causing a computer utilizing the program product to control an operation of the apparatus for recording optical information as claimed in claim 10, the instructions being for said selection section selecting an output voltage of said D/A converter circuit set to a predetermined voltage at time of seek operations for a predetermined position on said optical-information recording medium, and selecting the output voltage of said differential potential-dividing circuit after completing the seek operations.

14. A computer-readable information-recording medium having recorded the program as claimed in claim 13.

15. A computer readable program product having instructions embodied therein for causing a computer utilizing the program product to control an operation of the apparatus for recording optical information as claimed in claim 10, the instructions being:

for resetting at least the detected voltage of said first voltage-detecting circuit at time of seek operations for a predetermined position on said optical-information recording medium, and releasing the reset state after completing the seek operations; and for said selecting section selecting the output voltage of said differential potential-dividing circuit after an elapsing of an predetermined period from releasing of said reset state.

16. A computer-readable information-recording medium having recorded the program as claimed in claim 15.

17. The apparatus for recording optical information as claimed in claim 7, further comprising a D/A converter circuit configured to set multiple voltages enabled for outputting and a selecting section configured to select as the output voltage of said second voltage-detecting circuit as well as a voltage to be input to said differential potential—dividing circuit either one of the output voltage of said first voltage-detecting circuit and the output voltages of the D/A converter circuit.

18. The apparatus for recording optical information as claimed in claim 17, wherein said selecting section has a function of selecting an output voltage of said D/A converter circuit set to a predetermined voltage at time of seek operations for a predetermined position on said optical-information recording medium and selecting the output voltage of said second voltage-detecting circuit after completion of the seek operation.

19. The apparatus for recording optical information as claimed in claim 17, further comprising:

a releasing section configured to reset at least the detected voltage of said first voltage-detecting circuit during seek operations for a predetermined position on said optical—information recording medium and to release said reset state after completing the seek operations, wherein the output voltage of said first voltage-detecting circuit is selected by said selecting section after an elapsing of a predetermined period after said reset state is released by said releasing section.

20. A computer readable program product having instructions embodied therein for causing a computer utilizing the program product to control an operation of the apparatus for recording optical information as claimed in claim 17, the instructions being:

for resetting at least the detected voltage of said first voltage-detecting circuit at time of seek operations for a predetermined position on said optical-information recording medium, and releasing the reset state after completing the seek operations; and for said selecting section selecting the output voltage of said differential potential-dividing circuit after an elapsing of an predetermined period from the releasing section having released said reset state.

21. A computer readable program product having instructions embodied therein for causing a computer utilizing the program product to control an operation of the apparatus for recording optical information as claimed in claim 17, the instructions being for said selection section selecting an output voltage of said D/A converter circuit set to a predetermined voltage at time of seek operations for a predetermined position on said optical-information recording medium, and selecting the output voltage of said second voltage-detecting circuit after completing the seek operations.

22. A computer-readable information-recording medium having recorded the program as claimed in claim 21.

* * * * *